July 23, 1963   E. H. JERNBERG   3,098,683
BEARING STRUCTURE
Filed May 9, 1962

INVENTOR
EVERT H. JERNBERG

*Ikel C. Benson*
ATTORNEY

3,098,683
BEARING STRUCTURE
Evert H. Jernberg, St. Paul, Minn., assignor to Electric Machinery Mfg. Company, Minneapolis, Minn., a corporation of Minnesota
Filed May 9, 1962, Ser. No. 193,450
4 Claims. (Cl. 308—76)

The herein disclosed invention relates to bearing structures and particularly to sleeve-type bearings in which lubrication is procured by means of a ring encircling the journal and dipping into the oil in an oil reservoir provided in the base of the bearing.

An object of the invention resides in providing a construction in which the oil is cooled and maintained at a suitable temperature for continuous operation.

Another object of the invention resides in providing the base of the bearing with a wall structure forming a chamber within the same for the reception of the lubricating oil and in arranging the wall structure of said base so that the outer surface thereof is in heat transfer relation with the ambient air in which the bearing structure is employed.

Another object of the invention resides in providing the base of the bearing with a wall structure forming a chamber within the same for the reception of the lubricating oil and in arranging a coolant-cooled heat transfer surface therein which may act independently or supplement the cooling of the outer surfaces by ambient air.

A still further object of the invention resides in providing in said chamber an oil reservoir from which cooled oil is picked up by the oil ring and delivered to the bearing and in further providing a cooling compartment formed in part by the wall structure of the base and in which oil leaving the bearing is deposited.

An object of the invention resides in providing an oil deflector for picking up the surplus oil discharged from the oil ring and delivering it to the cooling compartment.

Another object of the invention resides in providing an oil catcher for picking up the oil discharged by the journal and delivering it to the cooling compartment.

A still further object of the invention resides in the specific construction for forming the oil reservoir and cooling compartment and the passageways therebetween as well as the passageways for directing the oil from the oil deflector and oil catcher into the cooling compartment to force oil to flow through the cooling compartment and into contact with surfaces in heat transfer relation to the ambient air or water.

Other objects of the invention reside in the novel construction and arrangement of parts and in the details of construction hereinafter illustrated and/or described.

Figure 2:
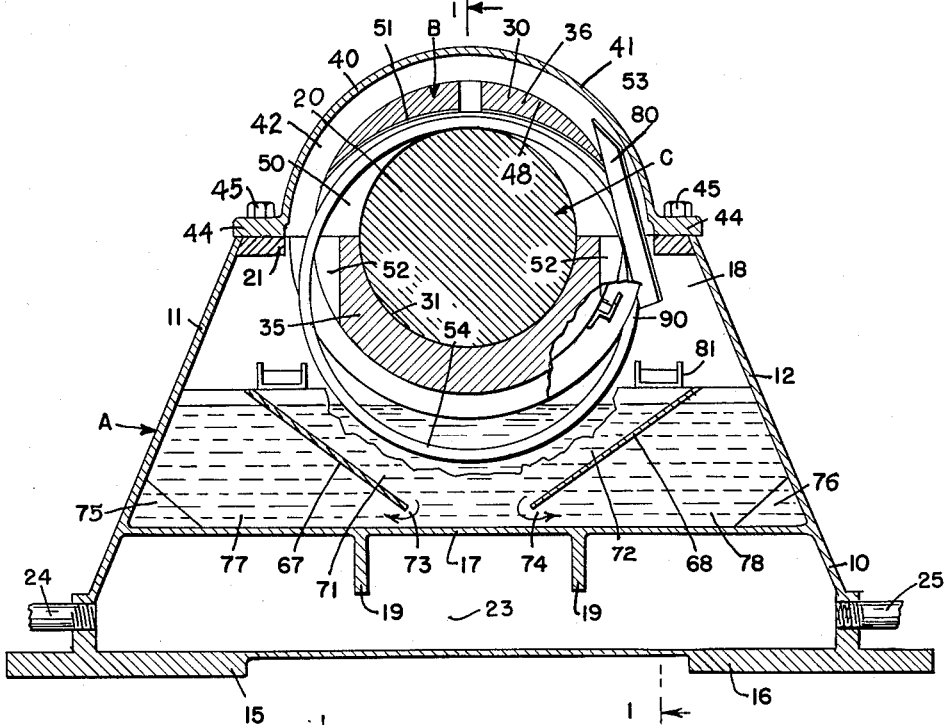
Figure 1:
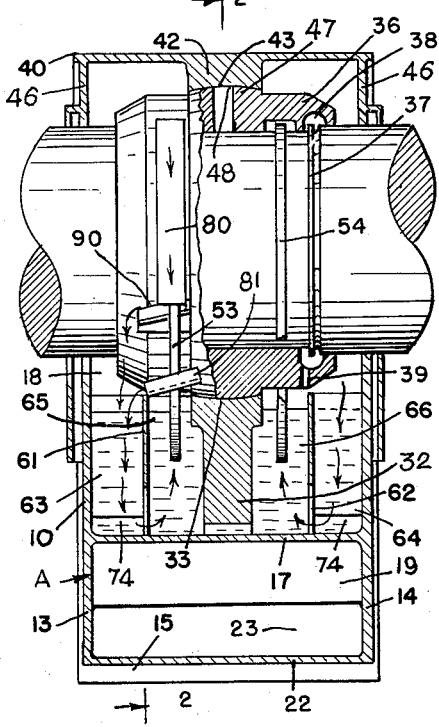

In the drawings:
FIG. 1 is a longitudinal elevational sectional view of a shaft and bearing structure therefor taken partly along the axis of the shaft and along line 1—1 of FIG. 2.
FIG. 2 is a cross sectional view taken on line 2—2 of FIG. 1.

The invention proper comprises a base A in which is supported a sleeve bearing B. In this bearing is rotatably mounted a journal C which may be a portion of the shaft to be supported. These parts will now be described in detail.

The base A is constructed from metal plates welded together at the corners and forming a wall structure 10 having side walls 11 and 12 and end walls 13 and 14. The lowermost portions of these walls have secured to them feet 15 and 16 and by means of which the bearing structure is supported on the surface on which it rests. A bottom 17 extends across the various walls of the wall structure and forms within the same chamber 18. Ribs 19 extend across the walls 13 and 14 and are welded to the bottom 17 to stiffen and reinforce the same. A sub-bottom 22 disposed at the lowermost portion of the frame A forms within the same and below the bottom 17 a coolant chamber 23. Water or other coolant may be directed into and out of chamber 23 by means of an inlet 24 and an outlet 25 to cool the bottom 17 of the base A.

The journal C consists of a portion of a shaft 20, the said shaft being the particular structure to be rotatably supported in the bearing structure. In the particular form of the invention illustrated the shaft 20 is of uniform diameter and the journal merely constitutes the portion which is journalled in the sleeve bearing B.

The sleeve bearing B consists of an annulus 30 constructed of suitable bearing material and which has a bore 31 receiving the journal C for rotation therein. At the top of the base A is provided a horizontal flange 21 whose upper surface lies in the plane containing the axis of the journal C. Extending across the walls 11 and 12 of base A and resting upon the bottom 17 thereof is a heavy partition 32. This partition is provided with a spherical seat 33 whose center lies in the surface of the flange 21 and in the axis of the journal C.

Superimposing and attached to the flange 21 is a cap 40 having a circular portion 41 with a collar 42 extending inwardly therefrom. This collar has a spherical seat 43 which forms a continuation of the seat 33 in partition 32 and which has the same center as the seat 33. The cap 40 is provided with flanges 44 which overlie the flanges 21 and are secured thereto by means of bolts 45. The cap 40 also has end members 46 which extend inwardly from the circular portion 41 and up to the shaft 20.

The bearing B is formed with a central circular ridge 47 having a spherical surface 48 received within the spherical seats 33 and 43 of the partition 32 and the collar 42. When the cap 40 is clamped down upon the base A the bearing is securely attached to the base. In such position the bearing may be aligned with the shaft to reduce friction therebetween.

The bearing B is preferably made in two halves 35 and 36 which meet at the horizontal axial plane of the bearing and which lies in the plane of the upper surface of the flanges 21. Formed in the half 36 of bearing B are grooves 50 which have curved upper surfaces 51 and which terminates substantially at the horizontal axial plane of said bearing. Two ducts 52 are formed in the half 35 of said bearing and which extend in a vertical direction and which communicates with the slot 50.

Within the interior of chamber 18 is provided two other partitions 61 and 62 which are parallel to and spaced from the partition 32 and provide two cooling compartments 63 and 64 adjacent the end walls 13 and 14 of the base A and two oil reservoirs 65 and 66 adjacent the partition 32. In conjunction with the reservoirs 65 and 66 two oil rings 53 and 54 are employed which are identical in construction and which operate in the same manner to lubricate the bearing B. Only the oil ring 53 shown in detail in the drawings will be described.

Mounted in the slot 50 of the upper half 35 of bearing B is the oil ring 53. This ring is of considerably larger inner diameter than the diameter of the journal C and projects outwardly through the groove 50 and through the ducts 52 and dips into the reservoir 65. Mounted in the reservoirs 63 and 64 are two baffles 67 and 68 which extend between the partitions 61 and 62 and the end walls 13 and 14. These baffles are arranged in inclined relation and converge toward the centers of chambers 63 and 64. These baffles form inner passageways 71 and 72 above the same and are spaced from the bottom 17 of base A to form openings 73 and 74 bringing said passageways into communication with the portions of the compartments 63 and 64 below said baffles. The partitions 61 and 62 have the outer corners thereof cut away to form openings 75 and 76 which communicate with the reservoirs 65 and 66. In this manner, outer passageways 77 and 78 are provided which lead the oil from the compartments 63 and 64 into the oil reservoirs 65 and 66.

The surplus oil carried by the rings 53 and 54 are collected by means of oil deflectors 80 which are U-shaped in cross section and which straddle the rings 53 and 54. These deflectors are mounted opposite the grooves 50 and 52 as best shown in FIG. 1 and are attached to the partition 32.

These deflectors are arranged substantially vertically and discharge into troughs 81 extending crosswise of the oil reservoirs 65 and 66 which in turn discharge into the compartments 63 and 64.

To collect the oil discharged from the journal C, oil catchers 90 are employed which are similar to the troughs 81 and which are attached to the lower halves 35 of the sleeve bearing B at the lowermost ends of the slots 52. Any oil discharged from the journal C at the locality of the grooves 50 and 52 is picked up by these oil catchers and discharged into the compartments 63 and 64.

The shaft diameter is increased at the extremities of the journal surface to form oil slingers 37 which rotate within the annulus 38 formed at the ends of the bearing 36. Drain holes 39, at the lower portion of the annulus 38 drain the hot end-leakage oil directly into the cooling compartments 63 and 64.

The invention is highly advantageous in that the base for the bearing is utilized as a reservoir for the oil to be fed to the bearing. In addition the base is constructed with walls in heat transfer relation with the ambient air and/or coolant and the cooling compartment disposed adjacent the same and whereby the oil heated by the friction of the journals in the bearing is cooled. The invention can be constructed at a very low cost. An advantage of the invention is the channeling of all oil picked up by the oil rings from the reservoir to the cooling compartment, thus providing a much greater circulation of oil past the cooling surfaces of the base than if end-leakage oil only provided the circulation, and the excess oil brought up by the oil rings were permitted to return directly to the reservoir. As a liquid will seek to maintain a level, any oil discharged into the cooling compartments must pass the cooling surfaces into the reservoir. The invention utilizes no moving parts excepting the rings and rapid circulation of the oil results.

Changes in the specific form of the invention, as herein described may be made within the scope of what is claimed without departing from the spirit of the invention.

Having described the invention, what is claimed as new and desired to be protected by Letters Patent is:

1. In a bearing structure having a base formed with a wall structure providing a chamber in the interior of the base containing lubricating oil, a sleeve bearing supported by said base, a journal journalled for rotation in said sleeve bearing, said bearing and journal having juxtaposed parts, one of said parts having an arcuate groove formed therein, said groove having an opening in the lower portion thereof, a ring of greater diameter than said journal and received in said groove and resting on said journal, the lower portion of said ring extending through said opening, means within said chamber forming an oil reservoir into which said ring extends, the combination of
   (e) a partition in said chamber dividing the same into an oil reservoir and a cooling compartment in heat transfer relation with respect to said wall structure,
   (f) a baffle in said cooling compartment forming an inner and an outer passageway,
   (g) said inner passageway extending toward the center of said chamber,
   (h) said outer passageway extending along said wall structure,
   (b) an oil deflector directing oil discharged from said ring into said inner passageway,
   (d) and means forming a passageway conducting oil from said outer passageway and to said oil reservoir.

2. In a bearing structure having a base formed with a wall structure providing a chamber in the interior of the base containing lubricating oil, a sleeve bearing supported by said base, a journal journalled for rotation in said sleeve bearing, said bearing and journal having juxtaposed parts, one of said parts having an arcuate groove formed therein, said groove having an opening in the lower portion thereof, a ring of greater diameter than said journal and received in said groove and resting on said journal, the lower portion of said ring extending through said opening, means within said chamber forming an oil reservoir into which said ring extends, the combination of
   (e) a partition in said chamber dividing the same into an oil reservoir and a cooling compartment in heat transfer relation with respect to said wall structure,
   (f) a baffle in said cooling compartment forming an inner and an outer passageway,
   (g) said inner passageway extending toward the center of said chamber,
   (h) said outer passageway extending along said wall structure,
   (b) an oil deflector directing oil discharged from said ring into said inner passageway,
   (d) and means forming a passageway conducting oil from said outer passageway and to said oil reservoir,
   (m) means forming a heat transfer surface that is coolant cooled and over which said oil flows.

3. In a bearing structure a base, a sleeve bearing supported by said base, a journal journalled for rotation in said sleeve bearing, said bearing and journal having juxtaposed parts, one of said parts having an arcuate groove formed therein, said groove having an opening in the lower portion thereof, a ring of greater diameter than said journal and received in said groove and resting on said journal, the lower portion of said ring extending through said opening,
   (o) said base comprising transversely extending spaced end walls in heat exchange relation with the exterior and
   (p) outwardly extending inclined longitudinal side walls, in heat exchange relation with the exterior and secured to said end walls,
   (q) a bottom disposed below said end and side walls and secured thereto,
   (r) a partition extending transversely across said side walls and down to said bottom, said partition being spaced from and substantially parallel to the juxtaposed end wall to provide a cooling compartment adjacent said end wall and an oil reservoir on the other side thereof and into which the oil ring extends,
   (s) inclined baffles disposed in said cooling compartment and extending in a longitudinal direction between said partition and said end wall and in an inclined direction from localities near the bottom and the vertical plane of the journal to outer localities above the first named localities to form inner passageways above said baffles and outer passageway below said baffles,
   (t) means for collecting oil discharged by said journal and depositing it into said inner passageways,
   (u) means forming openings at the lower ends of said baffles bringing the inner passageways into communication with the outer passageways and
   (v) means forming openings at the outer ends of said partition and adjacent said bottom and bringing the outer passageways into communication with the oil reservoir.

4. In a bearing structure a base, a sleeve bearing supported by said base, a journal journalled for rotation in said sleeve bearing, said bearing and journal having juxtaposed parts, one of said parts having an arcuate groove formed therein, said groove having an opening in the lower portion thereof, a ring of greater diameter than said journal and received in said groove and resting on said journal, the lower portion of said ring extending through said opening, (o) said base comprising transversely extending spaced end walls in heat exchange relation with the exterior and (p) outwardly extending inclined longitudinal side walls, in heat exchange relation with the exterior and secured to said end walls, (q) a bottom disposed below said end and side walls and secured thereto, (r) a partition extending transversely across said side walls and down to said bottom, said partition being spaced from and substantially parallel to the juxtaposed end wall to provide a cooling compartment adjacent said end wall and an oil reservoir on the other side thereof and into which the oil ring extends, (w) inclined baffles disposed in said cooling compartment and dividing the same into inner and outer passageways, (x) means adjacent said bottom for bringing the inner ends of said inner passageways into communication with said outer passageways and (y) means adjacent said bottom and said side walls for bringing the outer passageways into communication with the oil reservoir.

References Cited in the file of this patent

UNITED STATES PATENTS

| | | |
|---|---|---|
| 515,749 | Cole | Mar. 6, 1894 |
| 1,561,076 | Heitman et al. | Nov. 10, 1925 |

FOREIGN PATENTS

| | | |
|---|---|---|
| 3,606 | Great Britain | 1905 |